(12) United States Patent
Kurani et al.

(10) Patent No.: US 11,321,688 B1
(45) Date of Patent: *May 3, 2022

(54) CONTEXT-AWARE, VEHICLE-BASED MOBILE BANKING

(71) Applicant: Wells Fargo Bank, N.A., San Francisco, CA (US)

(72) Inventors: Ashish B. Kurani, Burlingame, CA (US); Nikolai Stroke, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,712

(22) Filed: Apr. 1, 2021

Related U.S. Application Data

(63) Continuation of application No. 15/204,815, filed on Jul. 7, 2016, now Pat. No. 10,997,570.

(60) Provisional application No. 62/190,997, filed on Jul. 10, 2015.

(51) Int. Cl.
*G06Q 20/10* (2012.01)
*G06Q 30/02* (2012.01)

(52) U.S. Cl.
CPC ....... *G06Q 20/108* (2013.01); *G06Q 30/0265* (2013.01)

(58) Field of Classification Search
CPC .................. G06Q 20/108; G06Q 30/0265
See application file for complete search history.

(56) References Cited

U.S. PATENT DOCUMENTS

| | | |
|---|---|---|
| 6,158,655 A | 12/2000 | DeVries et al. |
| 6,547,133 B1 | 4/2003 | DeVries et al. |
| 6,750,832 B1 | 6/2004 | Kleinschmidt |
| 6,812,942 B2 | 11/2004 | Ribak |
| 6,940,492 B2 | 9/2005 | Maritzen et al. |
| 7,796,056 B2 | 9/2010 | Fein et al. |
| 8,269,652 B2 | 9/2012 | Seder et al. |
| 8,348,154 B2 | 1/2013 | Sims et al. |
| 8,433,471 B2 | 4/2013 | Christensen et al. |
| 8,538,756 B2 | 9/2013 | Fujii et al. |
| 8,692,739 B2 | 4/2014 | Mathieu et al. |
| 8,694,241 B1 | 4/2014 | Kadous et al. |
| 8,872,647 B2 | 10/2014 | Prasad et al. |

(Continued)

OTHER PUBLICATIONS

William J. Horrey, Mary F. Lesch, Driver-initiated distractions: Examining strategic adaptation for in-vehicle task initiation, 2009, Accident Analysis & Prevention, vol. 41, Issue1, pp. 115-122.*

(Continued)

*Primary Examiner* — E Carvalho
(74) *Attorney, Agent, or Firm* — Foley & Lardner LLP

(57) ABSTRACT

A computer-implemented method of facilitating context-aware, vehicle-based mobile banking includes authenticating, by a processor of a financial institution computing system, a user of a vehicle with a financial account of the user. The vehicle is associated with the financial account and the user is physically located within the vehicle. Operating data relating to the vehicle is received. A context is determined based on the operating data. A task is selected based on the context. The task is to be performed by the user within the vehicle. The task relates to the financial account of the user. Performance of the task by the user is facilitated.

20 Claims, 5 Drawing Sheets

(56) References Cited

U.S. PATENT DOCUMENTS

| | | |
|---|---|---|
| 2003/0013438 A1 | 1/2003 | Darby |
| 2003/0127513 A1 | 7/2003 | DeVries et al. |
| 2004/0233045 A1 | 11/2004 | Mays |
| 2005/0156714 A1 | 7/2005 | McCarthy et al. |
| 2008/0100741 A1 | 5/2008 | Fujita et al. |
| 2008/0174414 A1 | 7/2008 | McCarthy et al. |
| 2010/0021015 A1 | 1/2010 | Bissett |
| 2010/0253602 A1 | 10/2010 | Szczerba et al. |
| 2012/0059573 A1 | 3/2012 | Nortrup |
| 2012/0274481 A1 | 11/2012 | Ginsberg et al. |
| 2014/0005937 A1 | 1/2014 | McCarthy et al. |
| 2014/0052681 A1 | 2/2014 | Nitz et al. |
| 2014/0156507 A1 | 6/2014 | Hanson et al. |
| 2015/0204687 A1 | 7/2015 | Yoon et al. |
| 2015/0310510 A1 | 10/2015 | Kelly et al. |
| 2016/0055502 A1 | 2/2016 | Pitz et al. |
| 2016/0092950 A1 | 3/2016 | Driscoll et al. |
| 2016/0188849 A1 | 6/2016 | Eramian et al. |
| 2016/0189146 A1 | 6/2016 | Cattone |
| 2016/0330027 A1 | 11/2016 | Ebrahimi |
| 2017/0048239 A1 | 2/2017 | Jeon et al. |
| 2017/0109715 A1 | 4/2017 | Aguirre et al. |
| 2017/0147975 A1 | 5/2017 | Natarajan et al. |

OTHER PUBLICATIONS

Schussler, N., et al., "Identifying trips and activities and their characteristics from GPS raw data without further information" 8th International Conference on Survey Methods in Transport, Annecy, May 2008, pp. 1-28 (Year: 2008).

Stopher, P., et al., "Deducing mode and purpose from GPS data" Institute of Transport and Logistics Studies, Apr. 2008, pp. 1-13 (Year: 2008).

Wu et al., A Prototype of Landmark-Based Car Navigation Using a Full-Windshield Head-Up Display System, ACM '09 Proceedings of the 2009 Workshop on Ambient Media Computing, Oct. 23, 2009, 7 pages.

* cited by examiner

CONTEXT-AWARE, VEHICLE-BASED MOBILE BANKING

CROSS-REFERENCE TO RELATED PATENT APPLICATIONS

This application is a continuation of U.S. application Ser. No. 15/204,815, filed on Jul. 7, 2016, and claims the benefit of priority to U.S. Provisional Application 62/190,997, filed Jul. 10, 2015, the contents of which are incorporated herein by reference in their entirety.

BACKGROUND

The proliferation of smart devices has enhanced individuals' productivity and quality of life. For example, smartphones allow individuals to send and receive email messages while away from their offices; wearable devices allow individuals to monitor and track their physical activity and sleep patterns; and vehicle telematics systems provide enhanced communication and navigation functionality for drivers. However, an ongoing need exists for context-aware smart devices that can sense their physical environment and adapt their behavior and functionality accordingly.

SUMMARY

Various embodiments relate to a computer-implemented method of facilitating context-aware, vehicle-based tasks. One example method includes authenticating, by a processor of a financial institution (FI) computing system, a user of a vehicle with a financial account of the user. The vehicle is associated with the financial account and the user is physically located within the vehicle. Operating data relating to the vehicle is received. A context is determined based on the operating data. A task is selected based on the context. The task is to be performed by the user within the vehicle. The task relates to the financial account of the user. Performance of the task by the user is facilitated.

Various other embodiments relate to a context-aware, vehicle-based mobile banking system. One example system includes a server system, including a processor and instructions stored in non-transitory machine-readable media. A user of a vehicle is authenticated with a financial account of the user. The vehicle is associated with the financial account and the user is physically located within the vehicle. Operating data relating to the vehicle is received. A context is determined based on the operating data. A task is selected based on the context. The task is to be performed by the user within the vehicle. The task relates to the financial account of the user. Performance of the task by the user is facilitated.

Various other embodiments relate to computer-implemented methods of facilitating context-aware, vehicle-based mobile banking. One example embodiment includes authenticating, by a processor of an FI computing system, a user of a vehicle with a financial account of the user. The vehicle is associated with the financial account and the user is physically located within the vehicle. Operating data relating to the vehicle is received therefrom. A context is determined based on the operating data. The context includes a context duration. An anticipated task relating to the financial account of the user is determined. A complexity of the anticipated task is analyzed. The complexity includes a task duration. If the context duration exceeds the task duration, performance of the anticipated task by the user is facilitated.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Online banking enables users to conduct financial transactions over a platform (e.g., a website) provided by an FI at which a user holds a financial account. As users become increasingly connected to the Internet (e.g., via smart devices, smartphones, smart vehicles, etc.), users may be able to perform various tasks, such as online banking, more frequently, efficiently and naturally, and with fewer limitations. Embodiments described herein provide the technical improvement of providing a platform to facilitate online banking over non-traditional mobile banking devices, such as smart vehicles. Embodiments described herein also provide the technical improvement of anticipating tasks (e.g., financial transactions) that are relevant to a user based on a monitored context of the user and/or smart device of the user, and facilitating such tasks while minimizing user effort. Embodiments described herein further provide the technical improvements of providing users with more timely information and obtaining information from users on a more timely basis, based on a detected context of the user and/or smart device of the user. Such technical improvements are necessarily rooted in computer-based technology. In particular, the technical improvements are necessarily rooted in the systems and networks required to facilitate online banking via smart devices. The technical improvements are also necessarily rooted in the systems and networks required to facilitate context-aware mobile computing (e.g., online banking), based on a monitored context of a user and/or smart device of the user.

In general, embodiments of the present disclosure provide systems and methods for context-aware mobile computing and, more specifically, context-aware, vehicle-based mobile banking. The systems and methods of the present disclosure enhance users' productivity by detecting particular contexts (e.g., down-time events) relating to a user's operation of a vehicle. Based on the context, various tasks (e.g., mobile banking tasks) that are suitable to be performed in the detected context are anticipated and information relating to those tasks is transmitted to the user via the vehicle. According to various embodiments, tasks may be active (e.g., categorizing transactions into budget categories or transferring funds), passive (e.g., viewing a budget status or a targeted advertisement), or any combination thereof.

Figure 1:
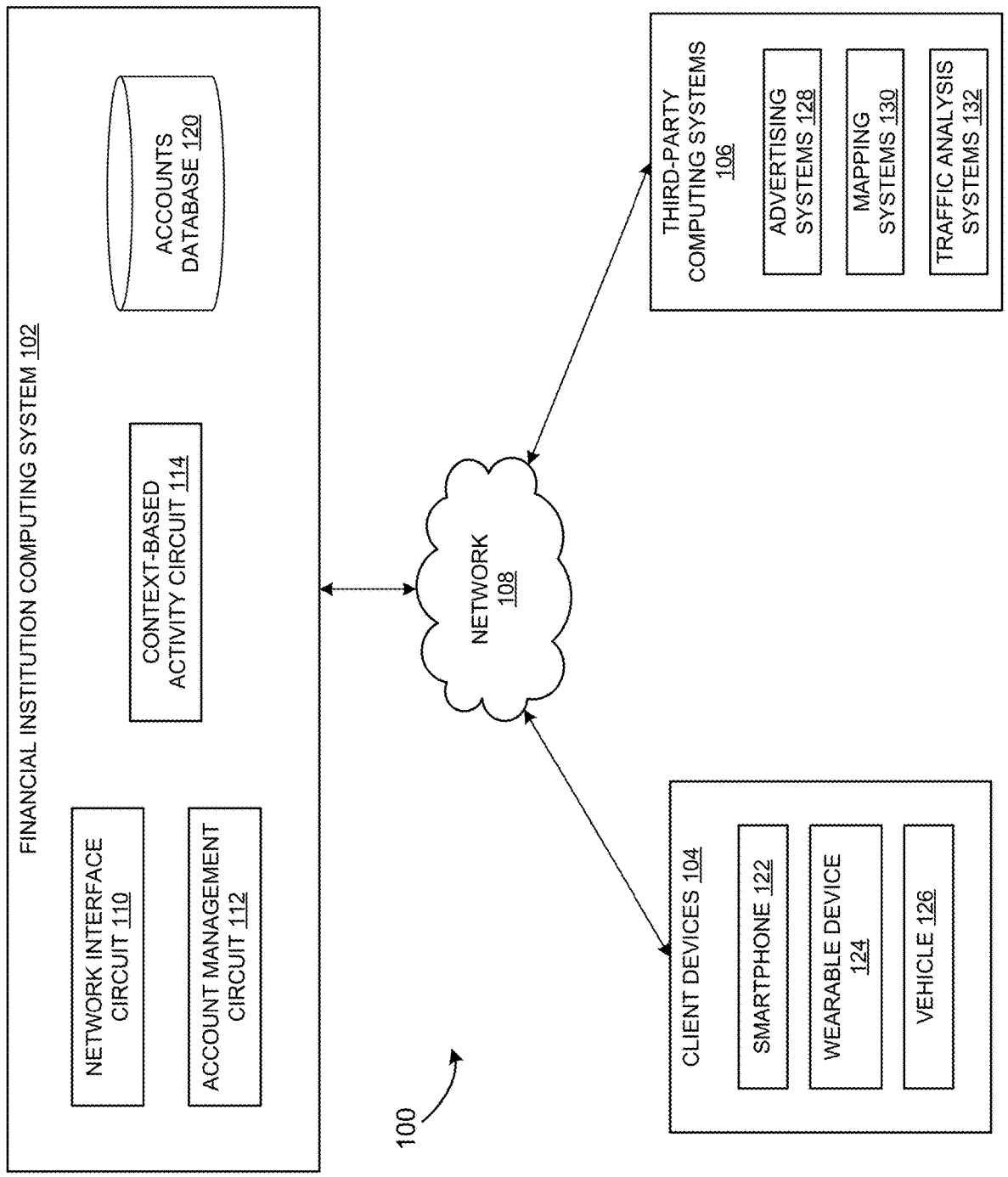
FIG. 1 is a block diagram illustrating a data processing system, according to an embodiment.

FIG. 1 is a block diagram illustrating a data processing system 100, according to an embodiment. The data processing system 100 includes an FI computing system 102 configured to, among other things, manage personal financial accounts at one or more FIs. In the example of FIG. 1, the FI computing system 102 is an enterprise computing system of an FI at which a user has one or more financial accounts.

The data processing system 100 also includes client devices 104 and third-party computing systems 106. The FI computing system 102, the client devices 104, and the third-party computing systems 106 are in operative communication with each other via a network 108 (e.g., the Internet or an intranet).

The FI computing system 102 may include, among other circuits, a network interface circuit 110, an account management circuit 112, and a context-based activity circuit 114. Such circuits and other circuits discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the FI computing system 102 may include server-based computing systems, for example, comprising one or more networked computer servers that are programmed to perform the operations described herein. In another example, the FI computing system 102 may be implemented as a distributed computer system where each function is spread over multiple computer systems.

Turning to the FI computing system 102, the network interface circuit 110 of the FI computing system 102 may be used to connect the FI computing system 102 to the Internet to permit users to access the FI computing system 102, for example, through an online banking website or other website, through an application, through a display or audio interface on one or more of the client devices 104 (e.g., a smartphone or vehicle display), or in other ways. For example, the network interface circuit 110 may include one or more computers or web servers that provide a graphical user interface (e.g., a series of dynamically-generated web pages) for users that access the FI computing system 102 through the web. The graphical user interface may be used to prompt the user to provide login information, passwords, or other authentication information (e.g., voice commands, gestures, biometrics, etc.) or other stored tokens. Upon successfully authenticating the user, the graphical user interface may be used to provide the user with account information. The network interface circuit 110 may also comprise other circuits that are configured to provide an interface for other types of devices such as mobile devices (e.g., cellular phones, smart phones, tablet computers, mobile e-mail devices, etc.), vehicle displays, fax machines, ATMs, server-based computing systems, etc. The network interface circuit 110 may provide access to an application programming interface (API) for vehicle telematics and/or infotainment systems, such as GM OnStar™, Ford SYNC™, Android Auto™, Apple CarPlay™ etc. In some embodiments, the FI computing system 102 is structured to manage other types of services, such as authentication systems for non-banking applications; device management, such as vehicle and internet-of-things ("IoT") device management; social media account management; etc.

The account management circuit 112 may interact with various backend systems in connection with maintaining financial accounts for account owners. For example, the account management circuit 112 may manage bank accounts (e.g., checking and savings accounts) and credit card accounts. It should be understood that the accounts may include, for example, fiat currency and/or math-based currency accounts. The account management circuit 112 may store account information for various users' accounts in one or more accounts databases 120. The account management circuit 112 manages each user's accounts by facilitating, among other things, account processing, account records, statement generation, budgeting, bill pay, funds transfers, etc. Account records include, among other things, records of financial transactions associated with each account. Financial transactions may include, for example, credits or debits to a user's account, such as the purchase of a good or the deposit of a paycheck, and various metadata associated therewith. The context-based activity circuit 114 is configured to facilitate various types of user activity based on a detected context. Context can include any of various factors, such as geolocation, detected activity (e.g., driving), proximity to other devices or locations, other external conditions (e.g., traffic or weather), etc. Different detected contexts may be particularly amenable to different tasks. For example, a context indicating that the user is driving in a vehicle on an expressway may be amenable to a passive audial task (e.g., checking an account balance). As another example, a context that a user has arrived to a frequently-patronized merchant may be amenable to providing account balances or budget statuses relating to that merchant, or displaying ads or offers relating to that merchant. According to various embodiments, the context-based activity circuit 114 may facilitate a task based on a "push," such as a notification or request transmitted to the user. The context-based activity circuit 114 may also initiate a task based on a "pull," such as a request or command received from the user.

The context-based activity logic 114 may also determine a particular authentication type or level necessary to perform a certain task. For example, if it is detected that the user is driving and wants to check an account balance, the context-based activity logic 114 may request that the user provides a voice sample for voice authentication. If it is detected that the user is driving and wants to perform a financial transaction, the context-based activity logic 114 may request that the user speaks a password, thereby providing two-factor authentication including a voice sample and a known password. If it is detected that the user is within a vehicle but the vehicle is parked, the context-based authentication logic 114 may prompt the user to provide a gesture or biometric sample for authentication. In some embodiments, the vehicle is associated with the user during an on-boarding device, thereby providing a "something you have" authentication factor for the user. This can be combined with other forms of authentication (e.g., "something you know" and "something you are") to provide multi-factor authentication.

The client devices 104 include, for example, a smartphone 122, a wearable device 124, and a vehicle 126. The client devices 104 are in operative communication with each of the FI computing system 102, the third-party computing systems 106, and with other of the client devices 104 via the network 108. The structure of the client devices 104 is described further in connection with FIGS. 2 and 3. Essentially, the client devices 104 interface with the FI computing system 102 to facilitate various activities, such as mobile banking. The client devices 104 provide input/output capabilities to implement the functionality of the context-based activity circuit 114 of the FI computing system 102. In addition, the client devices 104 may provide data (e.g., geolocation data) to each of the FI computing system 102 and the third-party computing system 106.

The third-party computing systems 106 include, for example, advertising systems 128, mapping systems 130, and traffic analysis systems 132. In some embodiments, one or more of the advertising systems 128, the mapping systems 130, and the traffic analysis systems 132 are implemented by the FI computing system 102 rather than by the third-party computing systems 106. The third-party computing systems 106 are in operative communication with each of the FI computing system 102, the client devices 104, and with other of the third-party computing systems 106 via the network 108. The third-party computing systems 106 provide enhanced functionality to each of the FI computing system 102 and the client devices 104.

The advertising systems 128 interfaces with the context-based activity circuit 114 of the FI computing system 102 to provide advertisements and offers to users via the client devices 104. Advertisements an offers may include any combination of text, images, audio, video, etc. The advertising systems 128 may include one or more merchants, advertising agencies, brokers, etc. The context-based activity circuit 114 may request advertisements or offers from the advertising systems 128 based on input data received from any of the FI computing system 102 (e.g., account balances) the client devices 104 (e.g., device geolocation), and the third-party computing systems 106 (e.g., merchant locations). The context-based activity circuit 114 provides the input data to the advertising systems 128 and the advertising systems 128 match the input data to advertising parameters of a database of advertisements and offers, and return the most relevant advertisement or offer to the context-based activity circuit 114. The context-based activity circuit 114 then conveys the advertisement or offer to one or more of the client devices 104 where it is presented to the user.

The mapping systems 130 and traffic analysis systems 132 provide digital mapping, navigation, and traffic information to the client devices 104. For example, the mapping systems 130 may generate digital maps and directions based on the geolocation of the client devices 104 (e.g., via a GPS signal or by triangulating distances from surrounding cellular phone towers). The mapping systems 130 and traffic analysis systems 132 may access internal or third-party databases (e.g., Google™, Here™, Waze™, Facebook™, Twitter™, Instagram™ Yelp™ FourSquare™, Trip Advisor™, OpenTable™, etc.) to provide mapping, navigation, and traffic data, as well as social media integration, reviews, merchant details, reservation functionality, etc. The traffic analysis systems 132 provide real-time traffic information to the client devices 104. In one embodiment, the traffic analysis systems 132 analyze geolocations received (e.g., crowd-sourced) from a large number of client devices 104 (e.g., smartphones 122 and vehicles 126). The traffic analysis systems 132 build a real-time traffic map based on monitoring the geolocation signals over time to determine the speed of each of the client devices 104. The traffic analysis systems 132 can also detect when client devices (e.g., vehicles 126) are stopped. The traffic analysis systems 132 can monitor traffic trends to determine typical traffic activity. For example, the traffic analysis systems 132 can determine the average stop time for each traffic light or the average wait line for a drive-thru, based on the time of day and day of week. The context-based activity circuit 114 can use this information to determine the context of the client devices 104 in order to facilitate optimal context-based activities.

Figure 2:
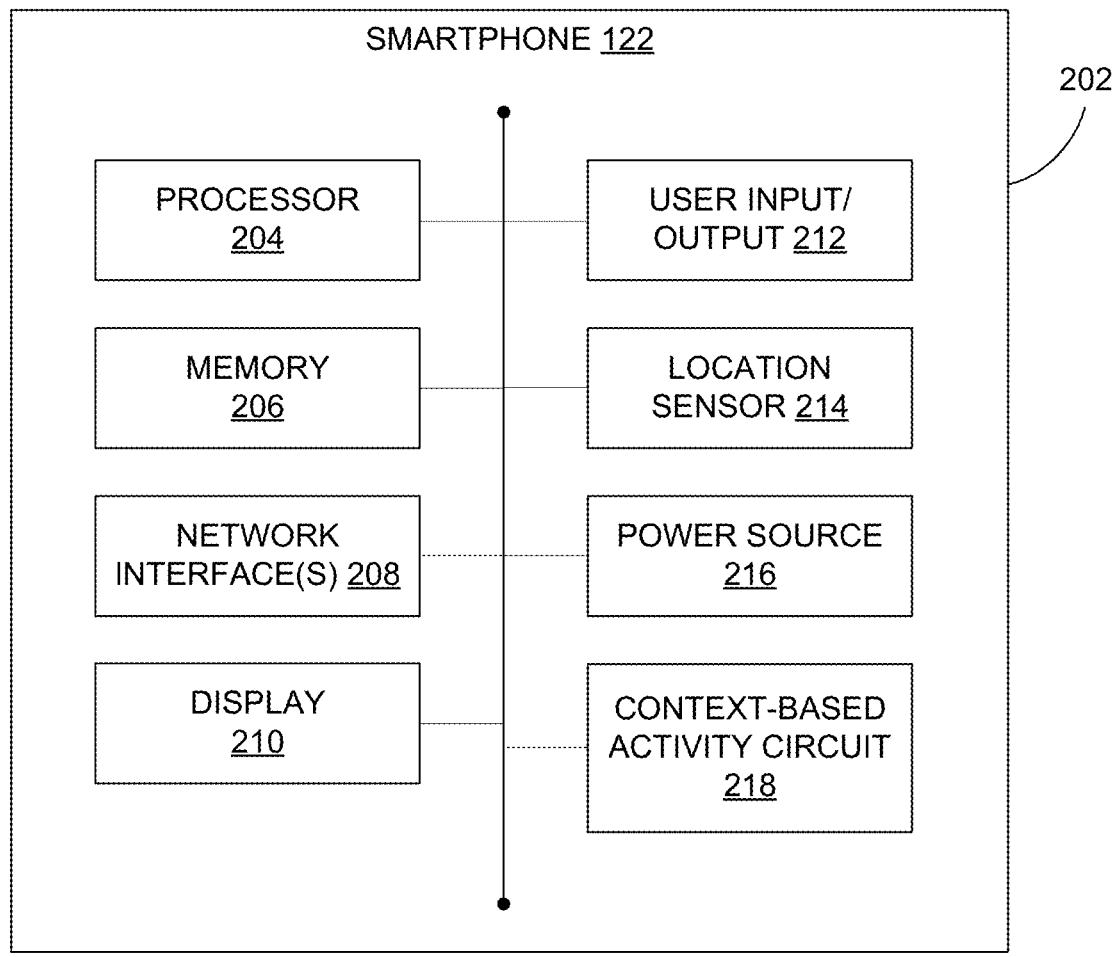
FIG. 2 is a block diagram of the smartphone of the system of FIG. 1, according to an embodiment.

Referring to FIG. 2, a block diagram of the smartphone 122 of FIG. 1 is illustrated, according to an embodiment. According to various embodiments, the smartphone 122 is any of a laptop computer, tablet computer, PDA, smartphone, portable media device, augmented reality device, etc. While FIG. 2 illustrates a block diagram of the smartphone 122, the wearable device 124 of FIG. 1 may include similar or the same features as those described in connection with the smartphone 122 and FIG. 2. As illustrated in FIG. 2, the smartphone 122 includes a housing 202. The housing 202 is coupled to the various electrical components of the smartphone 122. The smartphone 122 also includes a processor 204 and memory 206. The memory 206 includes program modules that, when executed by the processor 204, control the operation of the smartphone 122. The memory 206 may also store various applications, such as an application of the FI that facilitates communication between the smartphone 122 and the various computing systems of the FI computing system 102. The memory 206 may include any combination of RAM, ROM, NVRAM, etc.

The smartphone 122 also includes at least one network interface 208. In one example, the network interface 208 is a wireless network interface. The network interface 208 includes any of a cellular transceiver (e.g., CDMA, GSM, LTE, etc.), a wireless network transceiver (e.g., 802.11X, Bluetooth, NFC, Bluetooth Low Energy (BLE), RFID, ZigBee, etc.), or a combination thereof (e.g., both a cellular transceiver and a Bluetooth transceiver). The network interface 208 is capable of communicating with the other client devices 104 (e.g., via 802.11x, Bluetooth, BLE, NFC, RFID, etc.). Additionally, the network interface 208 is capable of communicating with the FI computing system 102 via the network interface circuit 110 over the network 108 (e.g., via the Internet as accessed through a cellular data network).

The smartphone 122 also includes a display 210 and a user input/output 212. In some examples, the display 210 and the user input/output are combined (e.g., as a touchscreen display device). In other examples, the display 210 and the user input/output 212 are discrete devices. The user input/output 212 includes any of touchscreen displays, buttons, speakers, keyboards, notification LEDs, microphones, biometric sensors (e.g., fingerprint scanners), switches, cameras, or a combination thereof.

In some implementations, the smartphone 122 includes a location sensor 214 (e.g., a GPS device) for determining the location of the smartphone 122. The smartphone 122 also includes a power source 216. The power source 216 may include any combination of grid power and battery power (e.g., alkaline batteries, lithium batteries, rechargeable batteries, etc.). In examples where the power source 216 is a rechargeable battery, the smartphone 122 also includes the circuitry necessary to recharge the battery.

The smartphone 122 also includes a context-based activity circuit 218. The context-based activity circuit 218, alone or in conjunction with the context-based activity circuit 114 of the FI computing system 102, is configured to facilitate various types of user activity based on a detected context. As described above in connection with the context-based activity circuit 114, the context-based activity circuit 218 may analyze a context of the user by analyzing data received from any of the FI computing system 102, the client devices 104, and the third-party computing systems 106. In order to make the context-based activity circuit 218, the FI computing system 102 may provide a software application that is available to be downloaded onto the smartphone 122 (e.g., directly or via an app store). Installation of the software application may then be performed. Thereafter, the thus-modified smartphone 122 includes the context-based activity circuit 218 (embodied as a processor and instructions stored in non-transitory memory that are executed by the processor).

In some embodiments, the smartphone 122 operates as the presentation layer and the vehicle 126 (more specifically, displays and/or speakers in the vehicle) operate as the application layer. In other words, the smartphone 122 (e.g., via a banking application running on the smartphone 122) may manage and process information transmitted between the vehicle 126, the FI computing system 102, and other systems.

Figure 3:
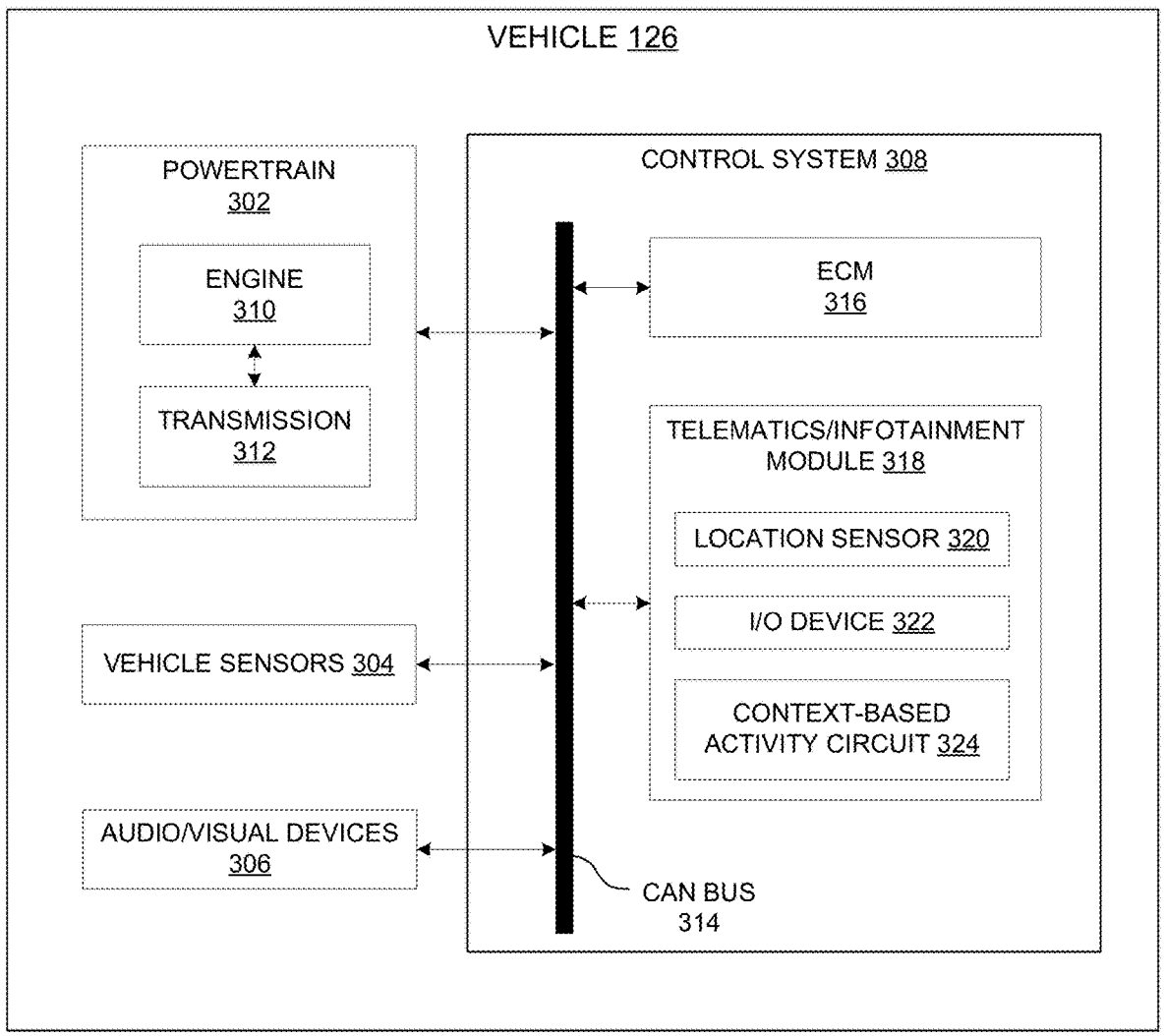
FIG. 3 is a block diagram of the vehicle of the system of FIG. 1, according to an embodiment.

Turning to FIG. 3, a block diagram of the vehicle 126 of FIG. 1 is illustrated, according to an embodiment. In general, the vehicle 126 includes a powertrain 302, numerous vehicle sensors 304, audio/visual devices 306, and an electronic control system 308. The powertrain 302 includes an internal combustion engine 310 operatively coupled to a transmission 312. The engine 310 can be powered by any of several different types of fuel, such as gasoline, diesel, natural gas, etc. The transmission 312 includes a plurality of gears through which torque is transferred from the engine 310 to satisfy various torque demands. In other embodiments, the transmission 312 is a continuously variable transmission. The vehicle sensors 304 can include hundreds of sensors that measure a wide range of vehicle operating parameters (e.g., geolocation, speed, occupant status, etc.) and operator inputs (e.g., accelerator position, gear selection, etc.).

The audio/visual devices 306 may include any of various devices capable of transmitting and receiving audio and video, such as speakers, microphones, display devices, cameras, etc. For example, audio/visual devices 306 may include any of several display devices, including an instrument cluster (including mechanical and/or electronic gauges), an in-dash display, and a head-up display (HUDs). For example, HUDs are transparent displays used in vehicles to display information (e.g., speedometer, tachometer, navigation, etc.) on the windshield so a driver can view the information without looking away from the road. HUD systems typically include a projection unit, which may be mounted in the dashboard of the vehicle, behind the steering wheel and below the windshield. In general, the projection unit is configured to project an image onto a combiner (e.g., a half mirror). The combiner redirects the projected image in a viewing direction of the driver such that the driver is able to simultaneously see the projected image and the field of view (e.g., the road viewed through the windshield). In some configurations, the front windshield is used as the reflective surface for the projected images instead of the combiner. Some configurations utilize a transparent phosphor coating on the windshield that reacts with a laser to display information. In some embodiments, the audio/visual devices 306 include one or more microphones to receive audial (e.g., voice) inputs from a user (e.g., a driver or passenger of the vehicle 126). In some implementations, the audio/visual devices 306 may be configured to determine whether an audial input is provided by a driver or by a passenger.

The electronic control system 308 is operatively coupled to each of the powertrain 302, the vehicle sensors 304, and the audio/visual devices 306 via a bus, such as a Communications Area Network (CAN) bus 314. The electronic control system 308 receives signals (e.g., vehicle parameter inputs) from the vehicle sensors 304. The electronic control system 308 analyzes the signals received from the vehicle sensors 304 and outputs control signals to control various aspects of the powertrain 302 and other vehicle components.

The electronic control system 308 includes various control modules such as an engine control module (ECM) 316, a telematics/infotainment module 318, and other control modules, such as a transmission control module, a body control module, etc. In some embodiments, certain control modules are integrated into a single module. For example, in certain example embodiments, the ECM 316 and the TCM are integrated into a powertrain control module (PCM). In addition to receiving signals from vehicle sensors 304, the ECM 316, the telematics module 318, and the other control modules are in operative communication with each other via the CAN bus 314. Each of the ECM 316 and the telematics/infotainment module 318 includes a processor and memory. The memory includes program modules that, when executed by the processor, control the operation of the vehicle 126. The memory may also store various applications, such as an application that facilitates communication between the vehicle 126 and the various computing systems of the FI computing system 102 and the third-party computing systems 106. The memory may include any combination of RAM, ROM, NVRAM, etc.

The telematics/infotainment module 318 is configured to enable the communication of information between the vehicle 126, the driver, and third parties. For example, the telematics/infotainment module 318 may control the information provided via the audio/visual devices 306, such as operational conditions, financial data, audio/visual entertainment, navigation information, etc. The telematics/infotainment module 318 may also be used to automatically or interactively request medical and/or roadside assistance in case of an emergency. The telematics/infotainment module 318 includes a location sensor 320, an I/O device 322, and a context-based activity circuit 324. The location sensor 320 may include a GPS chipset configured to monitor GPS signals to ascertain the location of the vehicle 126. The I/O device 322 may include a transceiver configured to send and receive data over a network (e.g., a cellular network, a wireless wide area network (WWAN), wireless local area network (WLAN), wireless personal area network (WPAN), or any combination thereof). For example, the I/O device 322 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol. For example, the I/O device 322 may enable communication between the vehicle 126 and each of the FI computing system 102, the client devices 104, and the third-party computing systems 106.

The I/O device 322 may also interface with the audio/visual devices 306 and the vehicle sensors 304 to send and receive data to/from users in the vehicle 126. For example, the audio/visual devices 306 may include microphones, touch-sensitive displays, buttons, knobs, etc. that are configured to receive inputs from a user.

The context-based activity circuit 324 of the telematics/infotainment module 318 of the vehicle 126, alone or in conjunction with the context-based activity circuit 114 of the FI computing system 102, is configured to facilitate various types of user activity based on a detected context. As described above in connection with the context-based activity circuit 114, the context-based activity circuit 324 may analyze a context of the user by analyzing data received from any of the FI computing system 102, the client devices 104, and the third-party computing systems 106. In order to make the context-based activity circuit 324, the FI computing system 102 may provide a software application that is available to be downloaded onto the telematics/infotainment module 318 (e.g., directly or via an app store). Installation of the software application may then be performed. Thereafter, the thus-modified telematics/infotainment module 318 includes the context-based activity circuit 218 (embodied as a processor and instructions stored in non-transitory memory that are executed by the processor). The telematics/infotainment module 318 may also interface with the FI computing system 102 via an API provided by the FI computing system 102.

Figure 4:
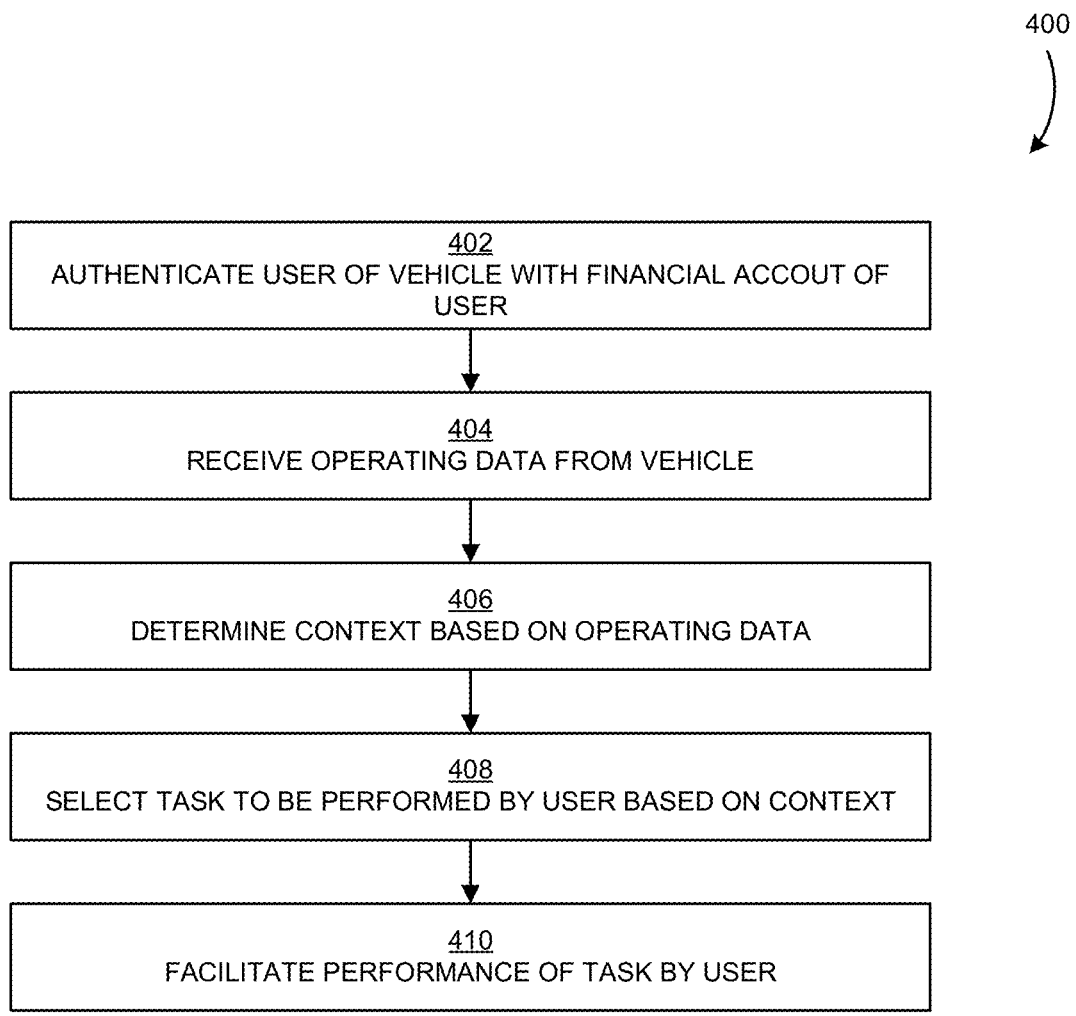
FIG. 4 is a flow diagram of a method of facilitating context-aware, vehicle-based mobile banking, according to an embodiment.

FIG. 4 is a flow diagram of a method 400 of facilitating context-aware, vehicle-based mobile banking, according to an embodiment. The method 400 can be performed, for example, by the FI computing system 102 of FIG. 1 or, more specifically, by the context-based activity circuit 114 of the FI computing system 102 based on information received from the client devices 104 (including the vehicle 126) and/or the third-party computing systems 106. The method 400 is directed to the technical challenge of minimizing time and effort required by users to perform online banking transactions. For example, to pay off a credit card bill using conventional online banking systems, a user would have to enter his or her online banking credentials, navigate to the pertinent area of the website, check account balances for the source account being used to make the payment, and then finally make the payment. Often, the payment is scheduled for a future date, so paying the bill further includes the step of scheduling the payment. The method 400 reduces the number of steps and the amount of time required to conventionally perform tasks such as this by facilitating the performance of context-dependent tasks. For example, the method 400 may allow users to perform certain tasks during down-time events in the vehicle. In doing so, the method 400 includes detecting particular contexts (e.g., down-time events) and automatically presenting tasks to the user that are suitable to be performed in the detected context. According to various embodiments, tasks may be active (e.g., categorizing transactions into budget categories or transferring funds), passive (e.g., viewing a budget status or a targeted advertisement), or any combination thereof.

Among other technical improvements, the method 400 improves the accuracy and granularity of online banking. For example, the method 400 provides users with more timely information (e.g., providing a user account balance and/or budget information as the user is pulling into an expensive restaurant). The method 400 also obtains information from users from a more timely basis (e.g., prompting a user to categorize a transaction into budget categories shortly after leaving a merchant). Accordingly, the method 400 improves both the quality and quantity of information associated with financial accounts of users.

At 402, the FI computing system 102 authenticates the user of the vehicle 126 with a financial account of the user. In some embodiments, to perform the authentication step at 402, the vehicle 126 must have already been associated with the financial account of the user and the user must be physically located within the vehicle. Upon completing the authentication step at 402, the user may access, via the vehicle 126, information relating to one or more of the user's financial accounts that are managed by the FI computing system 102. Similar steps may be used to authenticate other of the client devices 104 with the FI computing system 102.

To authenticate the user at 402, the FI computing system 102 receives authentication information from the vehicle 126. The authentication information may be physically entered by the user (e.g., a password or PIN provided by the user via the I/O device 322 of the vehicle 126), non-physically provided by the user (e.g., a voice sample of the user picked up by a microphone in the vehicle 126), provided by the vehicle 126 itself without involving the user (e.g., a customer token), or any combination thereof. For example, the authentication information may include any of a password, a PIN, a user ID, an answer to a verification question, a biometric (e.g., a picture of the user's face, a fingerprint, a voice sample, a retina scan, etc.), an identification of a security image, or a combination thereof. In some examples, no user authentication information is required. The authentication information may also be provided in the form of a customer token and/or a device token stored on the vehicle 126. The customer token and device token may be tokens that identify the user and the associated vehicle 126 to the backend FI computing system 102 in the future. The tokens are initially created by and encrypted by the FI computing system 102 and then transmitted to the vehicle 126. The tokens may be created as part of installing the FI application on the vehicle 126. After the tokens are created and stored on the vehicle 126, the tokens may be used to supplement or as a substitute for manually entered authentication provided by the user via the vehicle 126. In an example embodiment, each time the user accesses the FI computing system 102 with a new client device 104, the new client device 104 is assigned its own device token. A device and customer token are stored on each device in order to bind the device to the user (one client device can have only one user associated with it, but one user can have multiple client devices). In other embodiments, a client device 104 may be associated with multiple users. Once a client device 104 is registered with the user, the user may be required to manually enter less information during an authentication process than if the tokens are not present on the client device 104. For example, the user may have an online banking password consisting of a combination of eight or ten or more characters including numbers, upper and lower case characters, punctuation marks, and so on. Rather than enter the full online banking password, the user may only need to enter their existing ATM PIN, device password, or other information to be authenticated via the registered device.

The FI computing system 102 compares the received authentication information with stored and verified authentication information relating to the user. If the provided authentication information does not match, the FI computing system 102 sends a notification to the vehicle 126 indicating the information does not match. In these situations, the user may be prompted to reenter authentication information.

In some embodiments, possession by the user of the registered client device 104 provides an additional level of authentication that avoids the need for full login credentials. For example, in some implementations, once each of the vehicle 126 and another of the client devices 104 (e.g., the smartphone 122 and/or the wearable device 124) are registered with the user, authentication is automatically performed when the client device 104 is within a certain proximity of the vehicle 126 (e.g., detected by exchanging tokens therebetween). In other implementations, proximity of the client device 104 and the vehicle 126 may permit authentication via less rigid authentication information. For example, if the client device 104 and the vehicle 126 are within a certain proximity, authentication may be performed at 402 upon the user inputting a PIN instead of a full password. In another example, if the client device 104 and the vehicle 126 are within a certain proximity, authentication may be performed at 402 upon the user providing a voice sample. The FI computing system 102 may cross-reference the voice sample with a database to identify the user using voice biometrics.

According to various embodiments, different levels of authentication may be required depending on the task. In some embodiments, the user may be authenticated at a first authentication level via first authentication information and at a second authentication level using second authentication information. For example, the user may be authenticated at the first authentication level based on voice biometrics performed by the FI computing system 102 on a voice sample, or based on device proximity. The user may be permitted to perform certain tasks at the first authentication level, such as categorizing transactions into budget categories. If the user attempts to perform a task involving more confidential or otherwise sensitive data (e.g., checking balances, transferring funds, etc.), the vehicle 126 may prompt the user for additional authentication information to authenticate the user at a second authentication level. In another example, heightened authentication may be required if a payee is not a known biller. For example, less stringent authentication may be required for a payee that a user has been paying every month for some time as compared to a first-time payee. In a further example, no authentication may be required to display an offer relating to rewards or loyalty points for using a particular payment device at a merchant upon detecting that the vehicle 126 is within a particular proximity of the merchant. In a still further example, no authentication may be required to provide alerts to the user, such as fraud alerts.

Various authentication procedures may be utilized to protect against fraud scenarios that are unique to vehicles. For example, additional authentication information may be required depending on vehicle operating conditions, such as key-off, door open, detected passenger changes, etc., to guard against car-jacking or other technical mechanisms for subverting voice or other authentication mechanisms. In addition, the FI computing system 102 may utilize different login time-out parameters (e.g., automatically logging off after being inactive for a predetermined time) for transactions via the vehicle 126 compared to those utilized in conventional online banking platforms. For example, login time-out parameters may include vehicle data in addition to conventional user activity data. For example, upon authenticating the user, the FI computing system 102 may keep the user logged in until certain vehicle operating conditions (e.g., a gear change to park event, a key-off event, a door open event, etc.) are detected.

At 404, the context-based activity circuit 114 of the FI computing system 102 receives operating data from the vehicle 126. The operating data may include any of various types of operating conditions, such as vehicle speed, ignition key position, gear selector position, geolocation, operating time, operating distance, navigation parameters, fuel level, passenger detection, etc. In some embodiments, the operating data includes a plurality of operating conditions.

At 406, the context-based activity circuit 114 determines a context based on the operating data. Context may include any of several factors, such as context duration, complexity, number of steps, data sensitivity, etc. In some embodiments, the context-based activity circuit 114 determines context solely from the operating data. However, in other embodiments, the context-based activity circuit 114 determines context based on different context elements. For example, the operating data may include a first context element and the context-based activity circuit 114 may cross-reference a database to determine a second context element based on the first context element. For example, the operating data may include a geolocation and the context-based activity circuit 114 may cross-reference a database to determine traffic conditions based on the geolocation.

In some embodiments, one of the client devices (e.g., the smartphone 122 or vehicle 126) cross-references a database to determine a context element. The client device 104 may reference a database based on the operating data received from the vehicle 126 or based on operating data determined by the client device 104 (e.g., geolocation determined by the smartphone 122). The context elements may be first transferred to the vehicle 126 and relayed to the context-based activity circuit 114, or transferred directly to the context-based activity circuit 114 directly from another device or system (e.g., one of the client devices 104 other than the vehicle 126, or one of the third-party computing systems 106).

The context-based activity circuit 114 may receive context elements from any of several sources, including any of the client devices 104, the third-party computing systems 106, and other systems. In some implementations, one or more context elements are received from a device or system other than the vehicle 126. In some implementations, the context-based activity circuit 114 may receive the context elements in response to a query from the context-based activity circuit 114. The query may include the first context element (e.g., based on the operating data). In other implementations, the context-based activity circuit 114 may receive context elements automatically, without sending a query. For example, any of the client devices 104 or the third-party computing systems 106 may transmit context elements to the context-based activity circuit 114 automatically, without receiving a query therefrom. For example, the smartphone 122 may automatically transfer information (e.g., geolocation, call status, navigation parameters, etc.) to the context-based activity circuit 114.

For example, the context-based activity circuit 114 may receive a geolocation signal from the vehicle 126 and may cross-reference the geolocation signal with the mapping and/or traffic analysis systems 128, 132 to determine that the vehicle 126 is waiting in line at a pharmacy. In this context, the context-based activity circuit 114 may determine that the user has sufficient time to categorize a recent purchase into a budget category. Accordingly, the context-based activity circuit 114 may display information relating to the recent purchases and the budget categories on the user's vehicle 126 and/or the smartphone 122.

In another example, the context-based activity circuit 114 may receive a geolocation signal from the vehicle 126 and may cross-reference the geolocation signal with the mapping system 128 to determine that the vehicle 126 is located in the parking lot of a particular merchant at which the user has a rewards or loyalty account. In response, the context-based activity circuit 114 may cause an ad relating to accelerated or bonus rewards points to be displayed on a display device of the vehicle 126 and/or the smartphone 122.

In another example, the context-based activity circuit 114 may receive a geolocation signal from the vehicle 126 and may cross-reference the geolocation signal with the mapping and/or traffic analysis systems 128, 132 to determine that the vehicle 126 is approaching a stoplight. The mapping and/or traffic analysis systems 128, 132 may provide average stop times for the stoplight. Accordingly, the context-based activity circuit 114 may determine the context duration based on the average stop times, and may determine that the vehicle will be stopped. In this situation, the context may indicate that the user may be able to perform a more complex task, such as an active task that requires the user to make decisions and/or look away from the road (e.g., to view and/or enter information on the smartphone 122).

In another example, the context-based activity circuit 114 may receive speed and geolocation signals from the vehicle 126 and cross-reference those signals with the traffic analysis systems 128, 132 to determine that the vehicle 126 is in a traffic jam that is not expected to clear for a certain amount of time. Accordingly, the context-based activity circuit 114 may determine the associated context duration based on the traffic duration. In this situation, the context may indicate that the user may be able to perform only a simple task, such as a passive task that does not require the user to look away from the road or to process complex information to make a decision. For example, such a context may be amenable to voice commands (e.g., balance inquiries).

In another example, the context-based activity circuit 114 may receive a signal related to detection of a passenger in the vehicle. For example, the signal may be received from an occupant classification system (OCS) based on a pressure sensor located in the seat. The signal may also include relative sound pressure level measurements to identify the location of the source of a voice sample.

At 408, the context-based activity circuit 114 of the FI computing system 102 selects a task to be performed by the user based on the context. The task may relate to a transaction with the financial account that the user is anticipated to perform. For example, the context-based activity circuit 114 may detect that the user has recently made a purchase that is not yet allocated to a budget. For example, the purchase may have been made at a big-box retailer that may likely include items from several budget categories (e.g., groceries and clothing). Accordingly, an anticipated task may relate to allocating the purchase transaction into one or more budget categories. As another example, the context-based activity circuit 114 may detect that a utility bill is due in the next week and an anticipated task may relate to paying the utility bill. In some embodiments, the determined context may require certain additional levels or types of authentication.

In some embodiments, the context-based activity circuit 114 selects the task at least in part based on the operating data received at 406. For example, the operating data may include a destination inputted into the vehicle's 126 navigation system. The context-based activity circuit 114 may determine that the destination is an expensive restaurant. Accordingly, the task may relate to checking balances or budget information before arriving at the restaurant. In another example, the context-based activity circuit 114 may detect that the vehicle's 126 geolocation is near a particular merchant that the user frequently visits or a merchant that sells items on the user's grocery list or to-do list. Accordingly, the task may relate to displaying advertisements or offers for the merchant and/or navigating to the merchant.

The context-based activity circuit 114 may also select the task based at least in part on the complexity of the task relative to the context. As mentioned above, certain tasks are more complex than others. For example, certain tasks (e.g., budget categorization or funds transfers) may require multiple steps and multiple user inputs and may require a relatively long task duration. Other tasks (e.g., balance inquiries) may not require user inputs and may require a relatively short task duration. In addition, some tasks may include audio components, visual components, or a combination thereof. Tasks involving a visual component may be capable of displaying the visual component on a HUD or may require use of the user's smartphone 122. In addition, user inputs may be provided from various sources, depending on task requirements. For example, user inputs may be made via voice commands or physical inputs, such as via buttons or knobs on the vehicle 126 or via the user's smartphone 122. All such factors relate to the complexity of the task. To that end, certain tasks may be amenable to particular contexts, depending on their complexity.

In some embodiments, the context-based activity circuit 114 selects the task based at least in part on detection of a passenger in the vehicle 126. For example, a passenger may be capable of performing more complex tasks than a driver. In another example, the presence of a passenger may affect task selection, depending on the sensitivity of data that is to be involved while performing the task. In some examples, the context-based activity circuit 114 may request additional permission from the user before performing the task, depending on the presence of a passenger. In another example, the context may indicate whether the passenger is an infant, a child, or an adult, which may also affect the selection of a task. For example, an infant may not be able to comprehend finances, so the presence of an infant may not affect the selection of a task. In contrast, a parent may not want financial information to be shared with children or other adults.

At 410, performance of the task by the user is facilitated. As mentioned above, the task may be transmitted to the user via any combination of audio and visual components.

Furthermore, the task may be augmented with information provided via other of the user's client devices 104, such as the smartphone 122. Performance of the task may include receiving a request from the user to perform a transaction, and performing the transaction on the financial account based on the received request.

Figure 5:
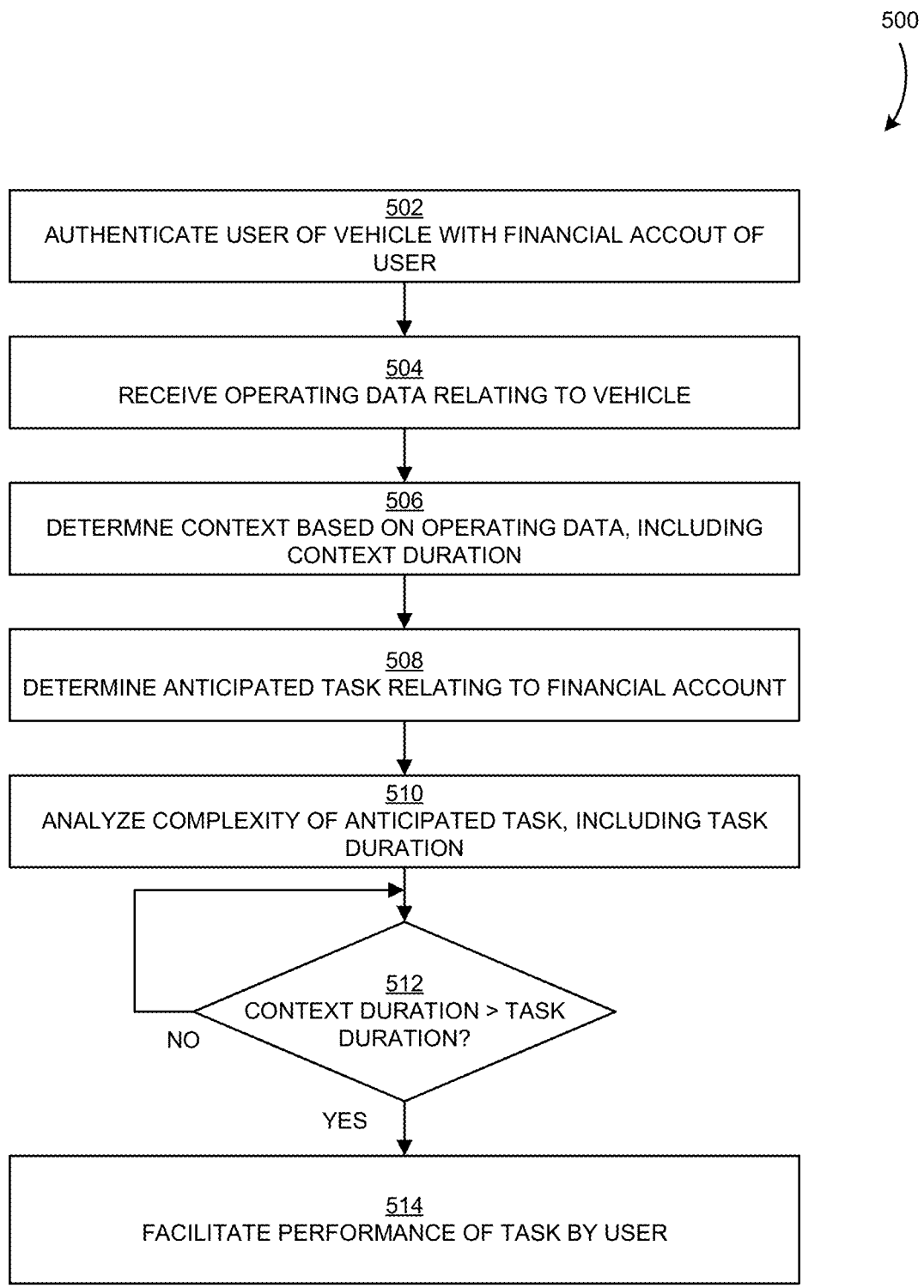
FIG. 5 is a flow diagram of a method of facilitating context-aware, vehicle-based mobile banking, according to another embodiment.

FIG. 5 is a flow diagram of a method 500 of facilitating context-aware, vehicle-based mobile banking, according to an embodiment. The method 500 can be performed, for example, by the FI computing system 102 of FIG. 1 or, more specifically, by the context-based activity circuit 114 of the FI computing system 102 based on information received from the client devices 104 (including the vehicle 126) and/or the third-party computing systems 106.

At 502, a user of a vehicle is authenticated with a financial account of the user by the FI computing system 102. The vehicle is associated with the financial account and the user is physically located within the vehicle. At 504, the context-based activity circuit 114 of the FI computing system 102 receives operating data from the vehicle 126. At 506, the context-based activity circuit 114 determines a context based on the operating data. The context includes a context duration. The context may be determined solely from the operating data, or from different context elements. For example, the context may indicate that, based on the geolocation of the vehicle 126, the vehicle 126 is expected to pass through certain stoplights. The context may further indicate which and/or how many stop lights the vehicle 126 is expected to be stopped at. The context duration may indicate the expected length of each of the stoplights.

At 508, the context-based activity circuit 114 determines an anticipated task relating to the financial account. The anticipated task may relate to transaction history, context, scheduled bills, or any of various factors. For example, if the user has recently completed a transaction, the anticipated task may relate to categorizing the transaction into a budget category. In another example, if a user has recently visited a restaurant but has not completed a transaction with the restaurant, the anticipated transaction may relate to transferring funds to another individual to split the bill.

At 510, the context-based activity circuit 114 analyzes the complexity of the anticipated task. The complexity of the anticipated task includes a task duration relating to the expected time required to complete the task. The complexity may also include other factors, such as whether the task includes sensitive data or requires data to be inputted by the user.

At 512, the context duration is compared to the task duration. If at 512, the context duration exceeds the task duration, at 512, the context-based activity circuit, via the vehicle 126, prompts the user to perform the task. For example, the vehicle 126 may transmit any combination of audio and/or video messages to the user. In response, the user may provide an input to the vehicle 126 to complete the transaction.

In some embodiments, the context-based activity circuit 114 divides the task into several sub-tasks, and prompts the user to perform each of the sub-tasks. The context-based activity circuit 114 may detect various contexts, and may prompt the user to perform different sub-tasks depending on the detected contexts. For example, the context-based activity circuit 114 may detect that the vehicle 126 is anticipated to encounter three or more contexts (e.g., to be stopped at three or more stoplights). For each of the detected contexts, the context-based activity circuit ensures that the context duration exceeds the sub-task duration before prompting the user to perform the corresponding sub-task. For example, upon detecting the first context (e.g., stoplight), the context-based activity circuit 114 may prompt the user to check an account balance of a source account. Upon detecting the second context (e.g., stoplight), the context-based activity circuit 114 may prompt the user to configure a payment (e.g., select a payment amount) for a payment from the source account. Upon detecting the third context (e.g., stoplight), the context-based activity circuit 114 may prompt the user to schedule and/or submit the payment.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method of facilitating context-aware, vehicle-based tasks, the method comprising:

authenticating, by a processor of a financial institution (FI) computing system, a user of a vehicle with a financial account of the user, the vehicle being associated with the financial account and the user being physically located within the vehicle;

receiving, by the processor, operating data relating to the vehicle;

determining, by the processor, a context based on the operating data;

identifying, by the processor based on the context, a selected task to be performed by the user within the vehicle, the selected task relating to the financial account of the user;

analyzing, by the processor, a task duration of the selected task;

comparing, by the processor, the task duration to an expected duration determined based on the context;

in response to determining that the expected duration exceeds the task duration, causing, by the processor, a prompt to be transmitted to the user to perform the selected task comprising:

transmitting, by the processor via a first network, the prompt to a telematics module of the vehicle, the telematics module comprising a second processor and a memory, wherein the second processor is communicatively coupled to the FI computing system via the first network;

causing a user device to run a banking application;

transmitting, by the second processor of the telematics module via a second network comprising a low-range wireless communication interface, the prompt to perform the selected task to the user device, wherein the prompt is displayed to the user via the banking application; and receiving, by the processor, an input provided from the user device via the banking application to complete the selected task, the input transmitted via one of a third network comprising a cellular data network and a combination of the first network and the second network.

2. The method of claim 1, further comprising:

receiving, by the processor from the vehicle, a request to perform a transaction, the transaction relating to the selected task; and performing, by the processor, the transaction on the financial account based on the received request.

3. The method of claim 1, further comprising requesting additional authentication from the user, by the processor, upon the operating data indicating at least one of a gear change to park event, a key-off event, or a door open event.

4. The method of claim 1, wherein the selected task includes providing information to the user relating to the financial account, the information comprising at least one of audial information and visual information displayed on a display device of the vehicle or on the user device.

5. The method of claim 1, wherein the context comprises at least one of geolocation information of the vehicle, proximity information regarding a merchant location relative to a location of the vehicle, a down-time event associated with the vehicle, a driving indicator for the vehicle, weather-related information, and traffic information.

6. The method of claim 1, wherein the selected task comprises an advertisement displayed on the user device.

7. The method of claim 1, wherein the selected task comprises a funds transfer.

8. The method of claim 1, wherein the operating data is transmitted from the vehicle to the processor via the user device.

9. The method of claim 1, wherein the user device is associated with the financial account of the user, and wherein the user is authenticated based at least in part on a detected proximity of the user device to the vehicle.

10. The method of claim 1, wherein the user is authenticated based at least in part on authentication information provided by the user to the vehicle.

11. The method of claim 1, wherein the user device is a smartphone.

12. A context-aware, vehicle-based mobile banking system, the system comprising:
a server system comprising a processor and instructions stored in non-transitory machine-readable media, the instructions configured to cause the server system to:
authenticate a user of a vehicle with a financial account of the user, the vehicle being associated with the financial account and the user being physically located within the vehicle;
receive operating data relating to the vehicle;
determine a context based on the operating data;
identify a selected task to be performed by the user within the vehicle, the selected task relating to the financial account of the user;
analyze a task duration of the selected task;
compare the task duration to an expected duration determined based on the context;
in response to determining that the expected duration exceeds the task duration, cause a prompt to be transmitted to the user to perform the selected task comprising:
transmit, via a first network, the prompt to a telematics module of the vehicle, the telematics module comprising a second processor and a memory, wherein the second processor is communicatively coupled to a financial institution computing system via the first network;
cause a user device to run a banking application;
transmit, by the second processor of the telematics module via a second network comprising a low-range wireless communication interface, the prompt to perform the selected task to the user device, wherein the prompt is displayed to the user via the banking application; and
receive an input provided from the user device via the banking application to complete the selected task, the input transmitted via one of a third network comprising a cellular data network and a combination of the first network and the second network.

13. The vehicle-based mobile banking system of claim 12, further comprising:
receiving a request to perform a transaction, the transaction relating to the selected task; and
performing the transaction on the financial account based on the received request.

14. The vehicle-based mobile banking system of claim 12, further comprising requesting additional authentication from the user upon the operating data indicating at least one of a gear change to park event, a key-off event, or a door open event.

15. The vehicle-based mobile banking system of claim 12, wherein the user device is associated with the financial account of the user, and wherein the user is authenticated based at least in part on a detected proximity of the user device to the vehicle or on authentication information provided by the user to the vehicle.

16. The vehicle-based mobile banking system of claim 12, wherein the wherein the selected task comprises an advertisement displayed on the user device.

17. A non-transitory computer-readable medium having processor-readable instructions stored thereon such that, when executed by a processor, the instructions cause the processor to facilitating context-aware, vehicle-based tasks by:
authenticating a user of a vehicle with a financial account of the user, the vehicle being associated with the financial account and the user being physically located within the vehicle;
receiving operating data relating to the vehicle;
determining a context based on the operating data;
identifying a selected task to be performed by the user within the vehicle, the selected task relating to the financial account of the user;
analyzing a task duration of the selected task;
comparing the task duration to an expected duration determined based on the context;
in response to determining that the expected duration exceeds the task duration, causing a prompt to be transmitted to the user to perform the selected task comprising:
transmitting, by the processor via a first network, the prompt to a telematics module of the vehicle, the telematics module comprising a second processor and a memory, wherein the second processor is communicatively coupled to a financial institution computing system via the first network;
causing a user device to run a banking application;
transmitting, by the second processor of the telematics module via a second network comprising a low-range wireless communication interface, the prompt to perform the selected task to the user device, wherein the prompt is displayed to the user via the banking application; and
receiving an input provided from the user device via the banking application to complete the selected task, the input transmitted via one of a third network comprising a cellular data network and a combination of the first network and the second network.

18. The non-transitory computer-readable medium of claim 17, wherein the selected task includes providing information to the user relating to the financial account.

19. The non-transitory computer-readable medium of claim 17, further comprising requesting additional authentication from the user, by the processor, upon the operating data indicating at least one of a gear change to park event, a key-off event, or a door open event.

20. The non-transitory computer-readable medium of claim 17, wherein the selected task comprises an advertisement displayed on the user device.

* * * * *